H. M. PFLAGER.
TRAILER TRUCK FOR LOCOMOTIVES.
APPLICATION FILED MAR. 16, 1915.
1,160,751.
Patented Nov. 16, 1915.
2 SHEETS—SHEET 1.
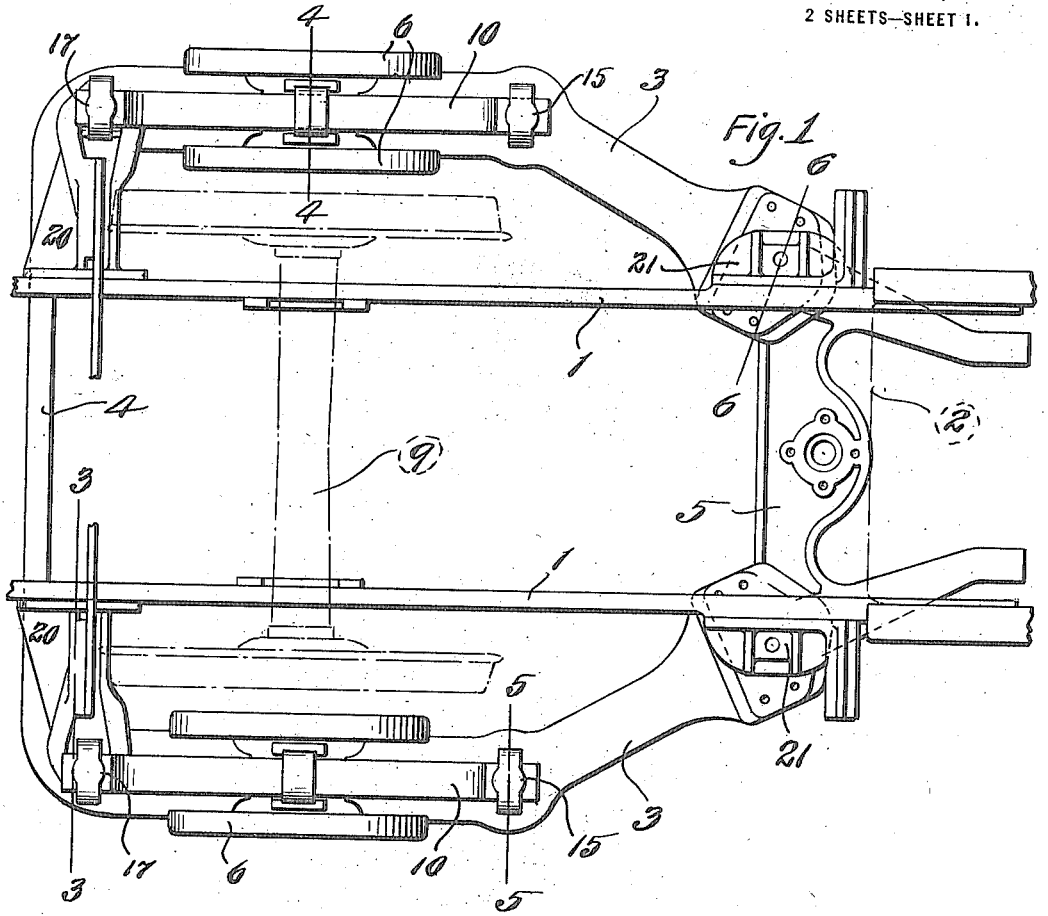
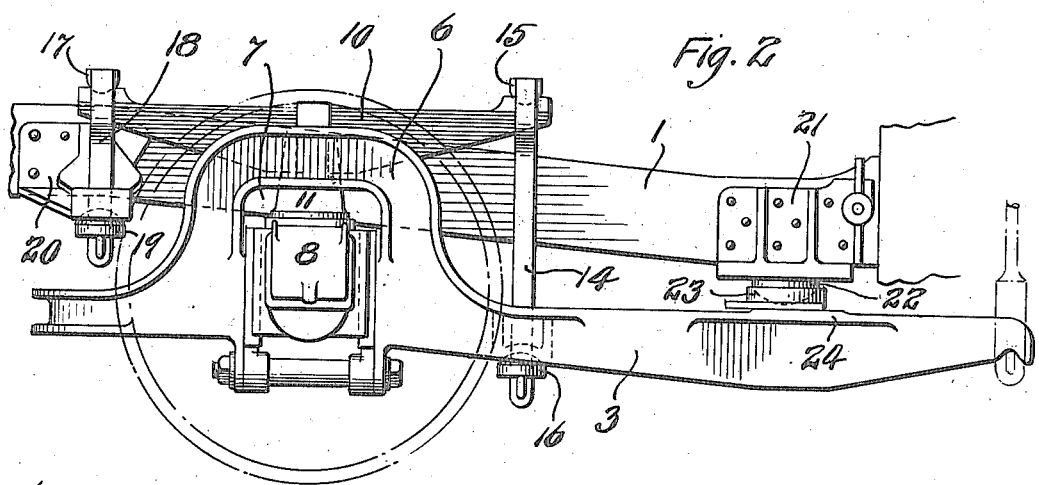
Witnesses
Wm. James
M. O. Smith
Inventor
Harry M. Pflager
By J. M. Cornwall.
Atty.

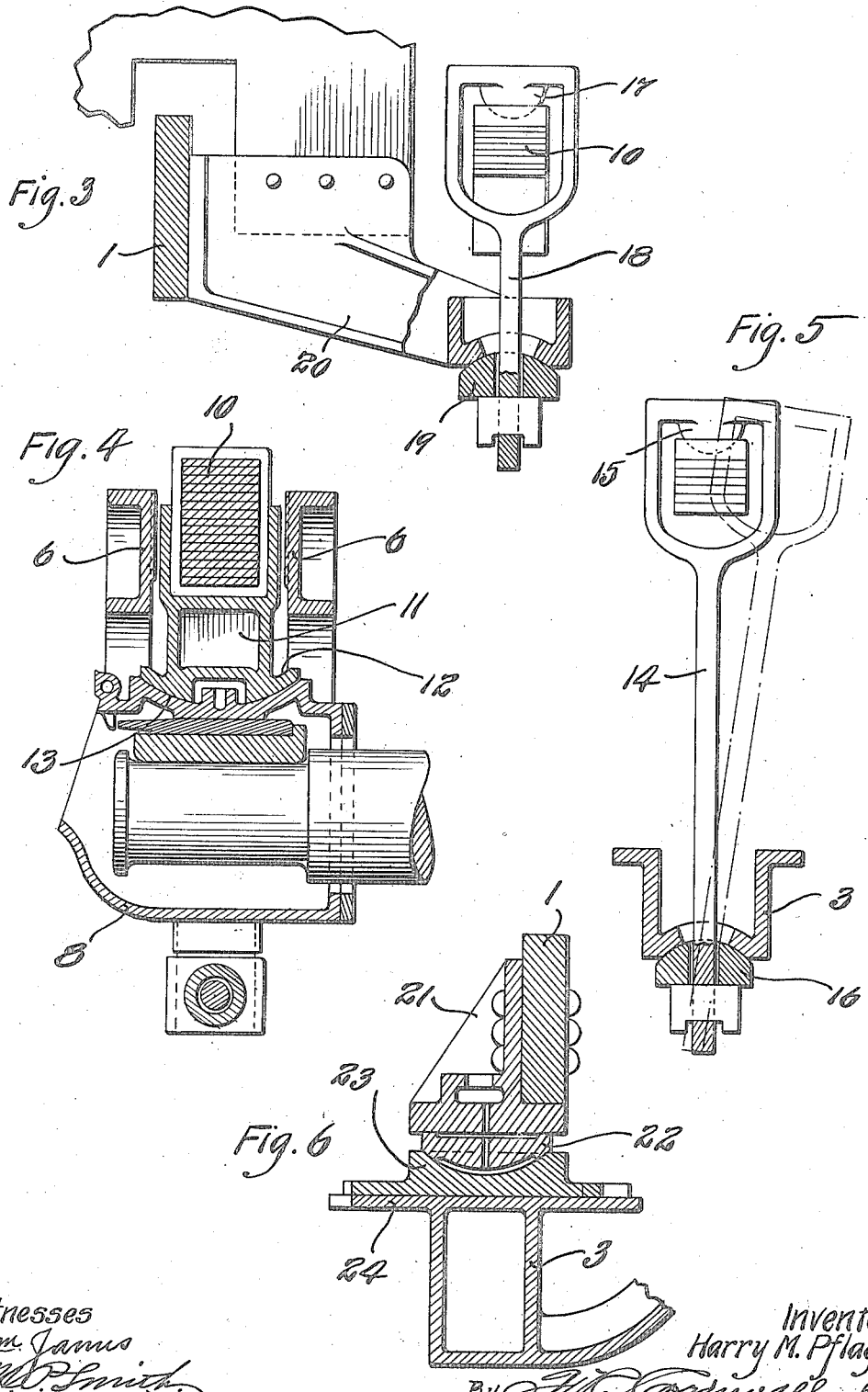

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

TRAILER-TRUCK FOR LOCOMOTIVES.

1,160,751.

Specification of Letters Patent.

Patented Nov. 16, 1915.

Application filed March 16, 1915. Serial No. 14,675.

*To all whom it may concern:*

Be it known that I, HARRY M. PFLAGER, a citizen of the United States, residing at St. Louis, Missouri, have invented a certain new and useful Improvement in Trailer-Trucks for Locomotives, of which the following is a full, clear, and exact description, such as will enable others skilled in the art to which it appertains to make and use the same, reference being had to the accompanying drawings, forming part of this specification, in which—

Figure 1 is a plan view of a trailer truck of my improved construction. Fig. 2 is a side elevational view of the truck. Fig. 3 is an enlarged cross section taken approximately on the line 3—3 of Fig. 1. Fig. 4 is an enlarged cross sectional view taken approximately on the line 4—4 of Fig. 1. Fig. 5 is an enlarged cross section taken approximately on the line 5—5 of Fig. 1. Fig. 6 is an enlarged cross section taken approximately on the line 6—6 of Fig. 1.

My invention relates generally to trailer trucks for locomotives and more particularly to the type of trailer trucks shown in Patents No. 773,713, dated November 1, 1904, No. 929,768, dated August 3, 1909, and No. 1,099,376, dated June 9, 1914.

The principal objects of my invention are to generally improve upon and simplify the construction of the present types of trailer trucks and particularly the types of trucks disclosed in the patents just mentioned, and further to provide a trailer truck wherein parts of the truck frame perform the functions of equalizers in transmitting the load which is the weight of the rear portion of the locomotive from the locomotive frame to the journal boxes which receive the axle carrying the trailer wheels.

A further object of my invention is to provide yielding supports and flexible connections between the rear portion of the trailer truck frame, the journal boxes for the trailer axle and the rear portion of the locomotive frame, thereby providing a construction which materially reduces service shocks and vibration and at the same time permits the rear portion of the trailer truck to move laterally from its normal central position as is the case when the locomotive traverses curved portions of the track.

With the foregoing and other objects in view, my invention consists in certain novel features of construction and arrangement of parts, hereinafter more fully described and claimed.

Referring by numerals to the accompanying drawings, 1 designates the main longitudinal members of the locomotive frame, the same being provided with a transversely disposed member 2, to which is pivotally connected the forward end of a trailer truck frame. This truck frame is preferably formed in a single piece, of the type shown in Patent 1,099,376, and comprises side members 3, rear rail 4, and front transverse member 5, which latter is pivotally connected to the transverse member 2 of the locomotive frame.

Formed integral with or fixed to the forward ends of the side members 3, are forwardly projecting arms or brackets 3ª which are adapted to serve as points of attachment for the lower ends of hangers 3ᵇ, which latter support the forward end of the trailer truck frame and connect the same with the main frame of the locomotive (see Fig. 2). It will be noted that these arms or brackets 3ª extend a substantial distance in front of the center bearing or point of pivotal connection between the trailer truck frame and the locomotive frame, said center bearing being formed on the transverse member 5 (see Fig. 1).

The rear portions of the side members 3 are arched as designated by 6 to provide openings 7 for the journal boxes 8 which receive the trailer axle 9. The upper portions of the arches 6 are bifurcated or divided lengthwise in order to receive semi-elliptic springs 10, the same being supported at their centers by saddles 11, which latter are provided at their lower ends with bearing plates 12 having convex lower faces and which latter rest in concave sockets 13 formed in the tops of the journal boxes 8. Such construction permits the saddles 11 carrying the springs 10 to rock freely in all directions.

The upper ends of the hangers 14 have ball and socket connections 15 with the forward ends of the springs 10, and the lower ends of these hangers have ball and socket connections 16 with the undersides of the side members 3 of the trailer truck frame. The rear ends of springs 10 have ball and socket connections 17 with the upper ends of hangers 18, the lower ends of which latter have ball and socket connections 19 with the undersides of brackets 20, the same being rigidly fixed in any suitable manner to the members 1 of the locomotive frame.

By providing flexible connections between the springs 10, the journal boxes 8 and the trailer truck frame and the locomotive frame as just described, provision is made whereby the springs can freely rock and swing during the transverse movement of the rear portion of the trailer truck frame with respect to the locomotive frame.

The load carried by the rear portion of the locomotive frame is transmitted directly to the trailer truck frame by means of brackets 21 which are fixed to the members 1 and which rest upon plano-convex bearing disks 22 which latter rest in socket plates 23, the same resting upon friction plates 24 that are formed integral with or fixed to the side members 3 of the trailer truck frame.

By my improved construction, the locomotive frame and its load is yieldingly and flexibly supported upon the journal boxes of the trailer axle and by providing connections between the locomotive frame and the rear ends of the springs which are mounted on the trailer truck journal boxes and providing direct bearings for the locomotive frame upon the forward portion of the trailer truck frame, parts of the latter, namely, the side members 3, perform the functions of equalizers in transmitting the weight of the rear portion of the locomotive to the journal boxes of the trailer axle.

When a trailer truck of my improved construction traverses curved portions of the track, said truck moves radially above its front pivot connection and the flexible connections between the ends of the springs and the truck frame and the locomotive frame readily permit said springs to move toward and away from the locomotive frame during this transverse movement of the truck frame.

It will be readily understood that minor changes in the size, form and construction of the various parts of my improved trailer truck can be made and substituted for those herein shown and described, without departing from the spirit of my invention, the scope of which is set forth in the appended claims.

I claim:

1. The combination with a locomotive main frame, of a trailer truck, the frame of which is pivotally connected near its forward end to said main frame, which main frame bears upon the frame of the trailer truck, springs supported by the journal boxes of the trailer truck, and flexible connections between said springs and the frame of the trailer truck and the locomotive main frame.

2. The combination with a locomotive main frame, of a trailer truck, the frame of which is pivotally connected to said main frame, springs supported by the journal boxes of the trailer truck, and flexible connections between said springs and the frame of the trailer truck and the locomotive main frame.

3. The combination with a locomotive main frame, of a trailer truck, the frame of which is pivotally connected to said main frame, and means supported by the journal boxes of the trailer truck and connected to the frame of said trailer truck and the locomotive main frame, whereby parts of the trailer truck frame serve as equalizers to transmit the load carried by the locomotive main frame to the trailer truck journal boxes.

4. The combination with a locomotive main frame, of a trailer truck, the frame of which is pivotally connected to said main frame, springs supported by the journal boxes of the trailer truck, links connecting said springs at one end to the frame of the trailer truck, and links connecting the other ends of the springs with the locomotive main frame.

5. The combination with a locomotive main frame, of a trailer truck, the frame of which is pivotally connected to said main frame, which locomotive main frame bears upon the forward portion of the frame of the trailer truck, springs supported by the journal boxes of the trailer truck, links connecting said springs at one end to the frame of the trailer truck, and links connecting the other ends of the springs with the locomotive main frame.

6. The combination with a locomotive main frame, of a trailer truck including a wheel carrying axle and journal boxes therefor, and flexible connections between the locomotive main frame and the frame of the trailer truck, which connections comprise springs mounted on the journal boxes, hangers between the forward ends of said springs and the trailer truck frame, and hangers between the rear ends of the springs and the locomotive main frame.

7. The combination with a locomotive main frame, of a trailer truck pivotally connected near its forward end to the locomotive main frame, which main frame bears upon the forward portion of the trailer truck frame, and flexible connections between the frame of the trailer truck and the locomotive main frame, which connections comprise springs mounted on the journal boxes, hangers between the forward ends of said springs and the trailer truck frame, and hangers between the rear ends of the springs and the locomotive main frame.

8. The combination with a locomotive main frame and pivotally mounted trailer truck, including a wheel carrying axle and journal boxes, of flexible connections between the frame of the trailer truck and the locomotive frame, which connections comprise springs mounted on the journal boxes, hangers between the forward ends of said springs and the trailer truck frame, and hangers between the rear ends of the springs and the locomotive main frame.

9. The combination with a locomotive main frame and pivotally mounted trailer truck, including a wheel carrying axle and journal boxes, of springs supported by the journal boxes of the trailer truck, and connections between said springs and the frame of the trailer truck and the locomotive main frame.

10. The combination with a locomotive main frame and pivotally mounted trailer truck, including a wheel carrying axle and journal boxes, of springs supported by the journal boxes of the trailer truck, links connecting said springs at one end to the frame of the trailer truck, and links between the other ends of the springs and the locomotive main frame.

11. The combination with a locomotive frame, of a trailer truck frame pivotally connected to the locomotive frame, and springs bearing upon the journal boxes of the trailer truck, the forward ends of which springs are connected to the trailer truck frame and the rear ends of which springs support the rear portion of the locomotive frame and parts carried thereby.

12. The combination with a locomotive frame, of a trailer truck frame pivotally connected thereto and supported at its forward end from said locomotive frame, springs positioned on the journal boxes of the trailer truck, connections between the forward ends of said springs and the trailer truck frame, and the rear ends of which springs support a portion of the locomotive frame and parts carried thereby.

13. The combination with a locomotive main frame, of a trailer truck including a wheel-carrying axle and journal boxes therefor, springs mounted for universal movement on the journal boxes, hangers between the forward ends of the springs and the trailer truck frame, there being universal joints between said hangers, the springs, and the trailer truck frame, and direct connections between the rear ends of the springs and the locomotive main frame.

14. The combination with a locomotive main frame, of a trailer truck including a wheel-carrying axle and journal boxes therefor, springs mounted for universal movement on the journal boxes, hangers between the forward ends of the springs and the trailer truck frame, there being universal joints between said hangers, the springs, and the trailer truck frame, and hangers between the rear ends of the springs and the locomotive main frame, there being universal joints between said hangers, the springs and the locomotive main frame.

15. The combination with a locomotive main frame, of a trailer truck including a wheel-carrying axle and journal boxes therefor, springs mounted for universal movement on the journal boxes, connections between said springs and the trailer truck frame, and connections between said springs and the locomotive main frame.

In testimony whereof I hereunto affix my signature in the presence of two witnesses, this 10th day of March, 1915.

HARRY M. PFLAGER.

Witnesses:
HAL C. BELLVILLE,
M. P. SMITH.